Oct. 5, 1937.    C. A. SABBAH ET AL    2,094,822
ELECTRIC VALVE CONVERTING SYSTEM
Filed Oct. 30, 1936    2 Sheets-Sheet 1
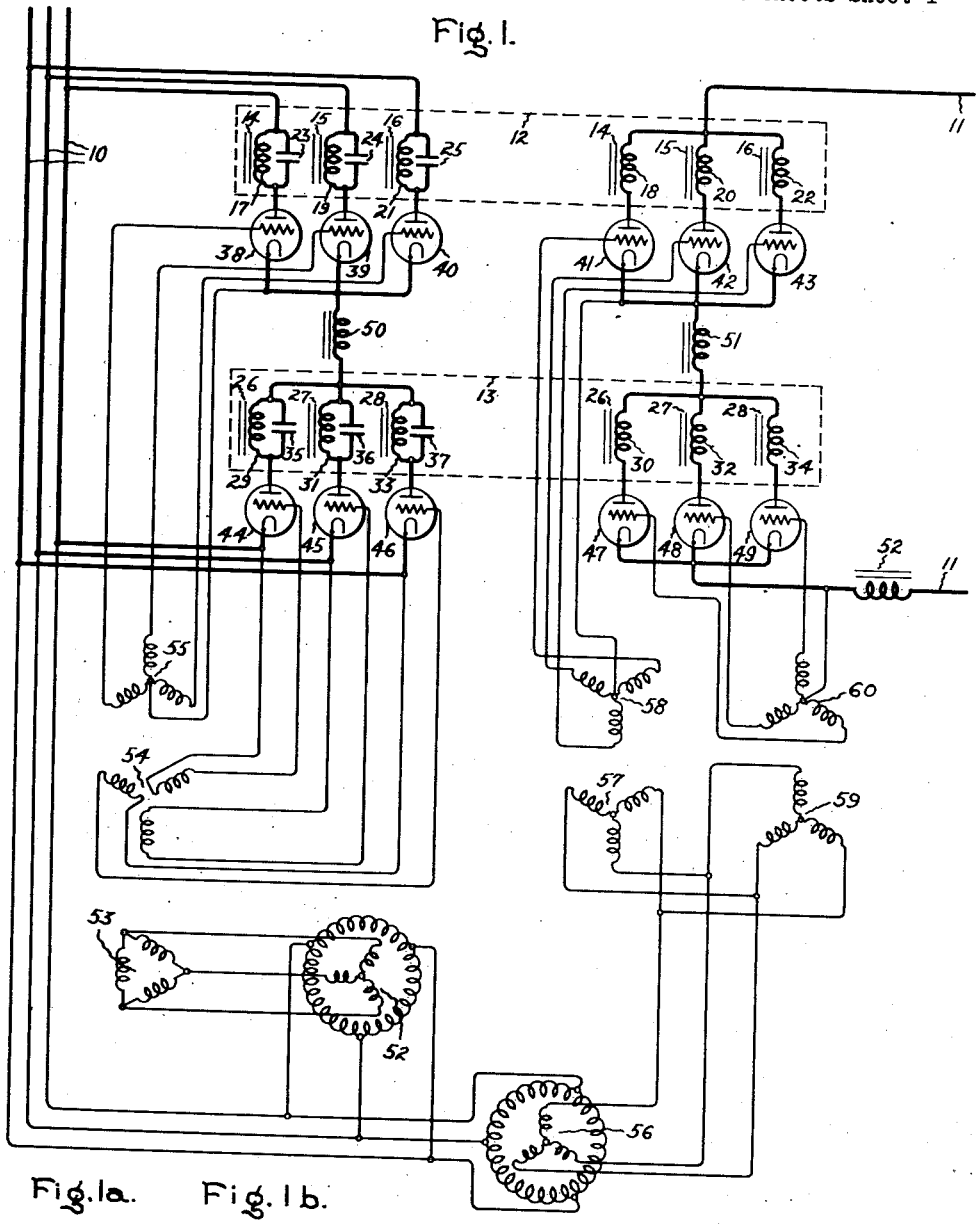
Fig. 1.
Fig. 1a.    Fig. 1b.
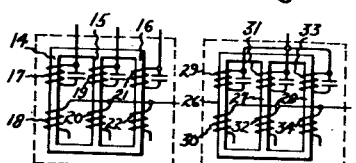
Inventors:
Camil A. Sabbah, Deceased.
by William A. Dodge, Administrator.
Carl C. Herskind,
by Harry E. Dunham
Attorney.

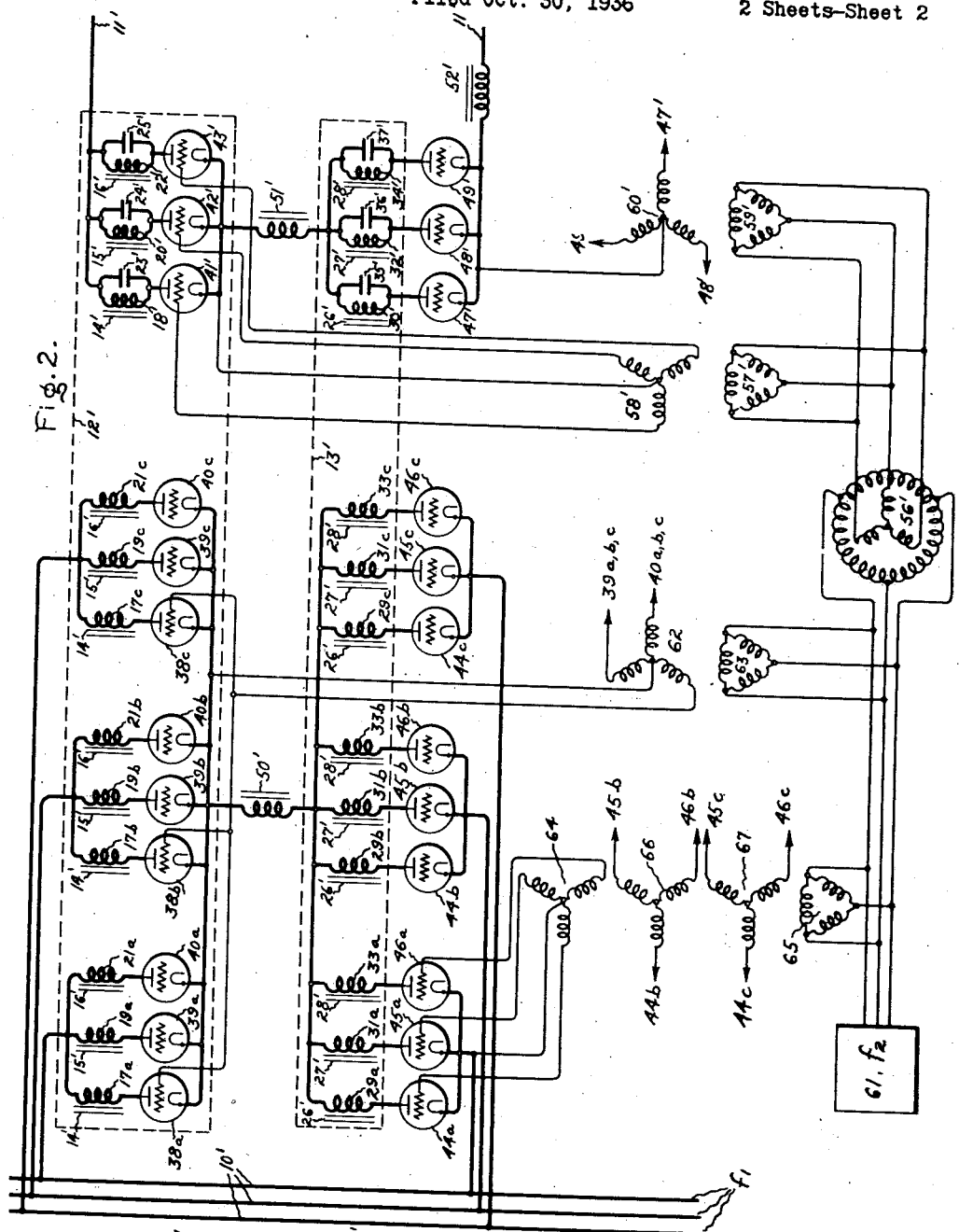

Patented Oct. 5, 1937

2,094,822

UNITED STATES PATENT OFFICE 2,094,822

ELECTRIC VALVE CONVERTING SYSTEM

Camil A. Sabbah, deceased, late of Schenectady, N. Y., by William A. Dodge, administrator, Schenectady, N. Y., and Carl C. Herskind, Scotia, N. Y., assignors to General Electric Company, a corporation of New York Application October 30, 1936, Serial No. 108,482

7 Claims. (Cl. 175—363)

This invention relates to electric valve converting systems and more particularly to such systems suitable for transmitting energy between direct and alternating current circuits, one of which has a constant current characteristic.

An electric valve converting system suitable for transferring energy between direct current circuits or between direct and alternating current circuits, one of which has a constant current characteristic is disclosed in United States Letters Patent No. 1,961,080, granted May 29, 1934, upon the application of C. A. Sabbah for improvements in an Electric valve converting system. This system utilizes an energy storage and transfer device comprising a multilegged reactor provided with a single inductive winding on each leg thereof, and having associated capacitors each connected across at least a portion of said inductive windings to maintain the total magnetomotive force of the core structure and that of each leg thereof substantially constant. The inductive windings on each leg are provided with intermediate terminals which are connected together through a polyphase alternating current network from which alternating current power may be obtained.

In the copending application of C. C. Herskind, Serial No. 89,599, filed July 8, 1936, for Electric valve converting systems, there is disclosed an electric valve converting system suitable for transferring energy between direct and alternating current circuits, one of which has a constant current characteristic, wherein the direct and alternating current circuits are independent, but the alternating current is obtained from a polyphase alternating current network.

In some instances there is indicated a desirability to provide similar systems wherein the direct and alternating current circuits are independent and wherein the additional alternating current network is eliminated. Furthermore, in addition to providing such an arrangement, there is indicated a desirability to provide a circuit arrangement whereby relatively large amounts of power may be transferred between the two circuits.

It is, therefore, an object of this invention to provide an improved electric valve converting system for transferring energy between direct and alternating current circuits, one of which has a constant current characteristic, which will overcome certain limitations of the arrangements of the prior art, and which will be simple and reliable in operation.

It is a further object of this invention to provide an improved electric valve converting system for transmitting energy between direct and alternating current circuits, one of which has a constant current characteristic wherein each of the circuits is dependent on the other, and the energy storage and transfer devices are directly interconnected with the alternating current circuit.

The novel features which are believed to be characteristic of this invention are set forth with particularity in the appended claims. The invention itself, however, both as to its organization and method of operation, together with further objects and advantages thereof, will be better understood by reference to the following description taken in connection with the accompanying drawings in which Fig. 1 represents one embodiment of this invention wherein the electric valve paths are rendered conductive at a frequency corresponding to the frequency of the alternating current circuit; Figs. 1a and 1b represent the inductors used in the system shown in Fig. 1; and Fig. 2 is another modification of this invention wherein the electric valve paths are rendered conductive at a frequency other than the frequency of the alternating current circuit, while Figs. 2a and 2b represent the inductors used in the system shown in Fig. 2.

Referring now more particularly to Fig. 1 of the drawings, there is illustrated an arrangement embodying this invention for transferring energy between the alternating current circuit 10 and the direct current circuit 11, one of which has a constant current characteristic. The system as shown is provided with a plurality of energy storage and transfer devices each comprising a three-legged magnetic core structure 12 and 13, respectively. The three-legged magnetic core structure is shown as having the three legs 14, 15, and 16 enclosed in the dotted line 12. This core structure is shown in greater detail in Fig. 1a. Each of the legs 14, 15, 16 is provided with a pair of inductive windings 17, 18; 19, 20; and 21, 22, respectively. Each pair of inductive windings is provided with energy storage devices which may be in the form of capacitors 23, 24, and 25. The capacitors 23, 24, and 25 may be connected in parallel with the inductive windings 17, 19, and 21, respectively, or across at least portions thereof so as to form energy storage circuits. The energy storage and transfer device 13 is represented in the drawings as having three magnetic legs 26, 27, 28 enclosed by the dotted line 13. This structure is shown in greater detail in Fig. 1b. Each of the legs 26, 27, 28 provided with a pair of inductive windings 29, 30; 31, 32; and 33, 34, respectively. Each pair of inductive windings is provided with energy storage devices which may be in the form of capacitors 35, 36, and 37. Capacitors 35, 36, and 37 may be connected in parallel with the windings 29, 31, and 33, respectively, or at least across portions thereof so as to form energy storage circuits. While the capacitors of the energy storage and transfer devices 12 and 13 have been shown to be connected to the windings which are connected to the alternating current circuit, it is understood that these capacitors could have been connected to the inductive windings which are associated with the direct current circuit. An electric discharge apparatus provides a controlled electric discharge path such as 38 to 49 for each of the windings of the energy storage and transfer devices in order to control the flow of energy therethrough. Each terminal of the inductive windings 17, 19, and 21 is connected to a different one of the alternating current lines 10, whereas the remaining terminals of these inductive windings are connected respectively to the anodes of the electric discharge paths 38, 39, and 40. The cathodes of the electric discharge paths 38, 39, and 40 are connected together through a reactor 50 to the upper terminals of the inductive windings 29, 31, and 33. The lower terminals of the inductive windings 29, 31, and 33 are connected, respectively, to the anodes of the electric discharge paths 44, 45, and 46, the cathodes of which are connected each to a different one of the alternating current lines 10. The upper terminals of the inductive windings 18, 20, and 22 are each connected to the upper side of a direct current circuit 11, whereas the lower terminals of these windings are connected respectively to the anodes of the electric discharge paths 41, 42, and 43. The cathodes of the electric discharge paths 41, 42, and 43 are connected together through the reactor 51 to the upper terminals of the inductive windings 30, 32, and 34. The lower terminals of the windings 30, 32, and 34 are connected to the anodes of the respective electric discharge paths 47, 48, and 49, the cathodes of which are connected together to the direct current circuit 11. In order to prevent any interaction between the electric valve converting apparatus and the direct current circuit 11 the reactor 52 may be connected between the apparatus and the direct current circuit.

The control electrodes or grids of the electric discharge paths 38, 39, 40, 44, 45, and 46 are energized from a suitable source of alternating current such as the alternating current circuit 10 through a phase shifting device 52 and the transformer windings 53, 54, and 55. The transformer windings 54 comprise parts of the grid circuits of the electric discharge paths 44, 45, and 46, while the transformer windings 55 comprise parts of the grid circuits of the electric discharge paths 38, 39, and 40. The control electrodes or grids of the electric discharge paths 41, 42, 43, 47, 48, and 49 may also be energized from the same source of alternating current 10 through the phase shifting device 56 and the transformer windings 57, 58, 59, and 60. The transformer windings 58 comprise part of the grid circuits of the electric discharge paths 41, 42, and 43, whereas the transformer windings 60 comprise part of the grid circuits of the electric discharge paths 47, 48, and 49. In accordance with common practice, the grid circuits of these valves may be provided with current limiting resistors.

While the electric discharge paths 38 to 49 comprising the electric valve apparatus have been shown as being individual valves each comprising an anode, a cathode, and a control electrode, it will be apparent to those skilled in the art that each of the groups of paths 38, 39, 40; 41, 42, 43; 44, 45, 46; and 47, 48, 49 may be replaced by single cathode, multianode discharge devices. While the valves or discharge devices may be any of the several types well-known in the art, it is preferable to utilize valves of the type containing an ionizable medium and which are provided with a control or starting electrode whereby the discharge paths between the anodes and cathodes may be controlled. It furthermore will be apparent to those skilled in the art that while the apparatus shown is being described as comprising an arrangement for transmitting energy from the alternating current circuit 10 to the direct current circuit 11, it may be utilized for transferring current in the opposite direction and that either one of the circuits in either instance may comprise the constant current circuit.

In operation, neglecting the leakage reactance between the windings common to each leg of the devices 12 and 13, the windings and capacitors associated with the core structure thereof serve to maintain the total magnetomotive force and that of each of the legs of the magnetic core structure at a substantially constant value. Each of the electric discharge paths 38 to 49 is conductive for 120 electrical degrees of each cycle, these valves becoming conductive in predetermined sequence at a frequency equal to that of the alternating current source 10, from which the control electrodes or grids are energized. In order to operate this system properly, the phase relation between the grid excitation of the valves 38, 39, 40, 44, 45, 46 and the valves 41, 42, 43, 47, 48, and 49 must be such that each of the valves of the one group becomes conductive in advance of the corresponding valve in the other group on the same leg of the energy storage and transfer device. This angle of advance between the excitation of the two corresponding groups of valves, as for example between valves 38 and 41, will lie between any value just greater than 0 degrees and slightly less than 180 degrees. The phase shifting devices 52 and 56 provide the means for obtaining this phase difference and also operate a control means for determining the amount of energy transferred between the two circuits. The voltage relation and power transfer relation between the two circuits is also dependent upon the ratio between the windings of each pair of windings on each leg of the core structures 12 and 13; the size of the capacitors 23, 24, 25, 35, 36, and 37 connected across the windings; and the phase relation between the excitation of the grids of the control electrodes of the valves 38, 39, 40, 44, 45, and 46, and 41, 42, 43, 47, 48, and 49.

The functions performed in the operation of the system by the energy storage transfer devices 12 and 13, the windings thereon, the associated capacitors and electric discharge paths will perhaps be clarified by the following example of one cycle of operation by the electric valves 38 and 41 associated with one leg of the core structure 12. If we assume, for example, that the grid excitation supplied to the control electrodes of the valves 38 and 41 differs by a phase difference of 120 electrical degrees, the valve 41 will be conductive for 120 electrical degrees and meanwhile the valve 38 will remain nonconductive. It will be assumed that the capacitor 23 has been charged to a certain potential by previous operation and it now discharges into the winding 17, so that by magnetic coupling with winding 18, energy is supplied to valve 41. At the end of the period of conductivity of the valve 41, the valve 38 becomes conductive and the valve 41 now becomes nonconductive. Thus the current transmitted by the valve 38 serves to store energy in capacitor 23 during the period of conductivity of this valve. At the end of the period of conductivity of the valve 38, the current is transferred from this valve to one of the other valves 39 or 40 and during the next 120 electrical degrees the valves 38 and 41 both remain nonconductive. During the period when both these valves are nonconductive, the capacitor 23 discharges into the transformer winding 17 in order to maintain the required magnetomotive force on this transformer winding and in so doing the potential of the capacitor reverses polarity so that it has the proper polarity to supply power to the anode of valve path 41 when this valve is again permitted to become conductive. The apparatus associated with the energy storage and transfer device 13 operates in a manner similar to that described in connection with the device 12. It of course will be obvious to those skilled in the art that during the time that the valve 41 is conductive, the current passed by this valve was transmitted through the inductor 51 and the inductive winding 34 during the first half of the period of conductivity and during the second half of the period of conductivity through the inductive winding 32. Similarly, the current transmitted by the electric discharge path 38 during the first half of the period of conductivity flows through the reactor 50 and the inductive windings 33 through the valve 46 while during the latter half of the period of conductivity of the valve 38 the current was transmitted through winding 31 and valve 45 to the alternating current circuit 10.

In Fig. 2 there is disclosed an electric valve converting system suitable for transferring energy between direct and alternating current circuits, one of which has a constant current characteristic. Since this system utilizes apparatus which corresponds to certain elements in Fig. 1, and the operation thereof is similar, these elements have been given primed reference characters. In this arrangement, however, the capacitors have been transferred to the direct current side so that capacitors 23', 24', 25', 35', 36', and 37' are respectively connected in parallel with the inductive windings 18', 20', 22', 30', 32', and 34'. The remainder of the apparatus associated with the direct current circuit is the same as that disclosed in Fig. 1. On the alternating current side, however, the inductive windings 17, 19, 21, 29, 31, and 33 have each been replaced by a series of windings designated as a, b, and c. The manner of arranging the inductive windings on the core structures 12' and 13' is shown in Figs. 2a and 2b, respectively. Each of the electric valves has also been replaced by three electric valves indicated by the characters a, b, and c.

The control electrodes of the valves associated with the direct current side of the apparatus are energized from a suitable source of alternating current 61 designated $f_2$. This may be any frequency other than that of the alternating current circuit 10' which has been designated $f_1$, although I prefer that this frequency $f_2$ be higher than frequency $f_1$. The control circuit of the electric discharge paths 41', 42', 43', 47', 48', and 49' are therefore energized from the source 61 through the phase shifting device 56', the transformer windings 57', 58', and the transformer windings 59' and 60'. In the apparatus associated with the device 12' the control electrodes of the valves 38a, 38b, 38c are all energized from the same winding of the transformer secondary 62, the primary 63 of which is connected directly to the source of alternating current 61. In the apparatus associated with the energy storage and transfer device 13', however, the electric valve paths 44a, 45a, and 46a are each energized from a separate secondary winding 64 of a transformer, of which the primary winding 65 is connected to be energized from the source of alternating current 61. The secondary winding 66 of the transformer energizes the group of valves indicated by the b subscript whereas the secondary winding 67 energizes the group of valves indicated by the c subscript. Since the control electrodes of the various electric discharge paths are excited from the source of frequency $f_2$ which is preferably a higher frequency than that of the alternating current circuit 10', it will be apparent to those skilled in the art that the discharge paths 41', 42', 43', 47', 48', and 49' are rendered conductive at a higher frequency than was the case in Fig. 1. Because of this fact, the size of the capacitors 23', 24', 25', 35', 36', and 37' may be reduced considerably, thereby resulting in a considerable economic saving.

Since the operation of the embodiment of the invention illustrated in Fig. 2 is substantially in accordance with the principles of operation set forth in detail in connection with the description of Fig. 1, it is therefore not believed that any further description is necessary for a complete understanding of this embodiment of the invention.

While this invention has been shown and described in connection with certain specific embodiments, it will, of course, be understood that it is not to be limited thereto, since it is apparent that the principles herein disclosed are susceptible of numerous other applications, and modifications may be made in the circuit arrangement and in the instrumentalities employed without departing from the spirit and scope of the invention as set forth in the appended claims.

What is claimed as new and desired to be secured by Letters Patent of the United States is:

1. An electric valve converting system for transferring power between direct and alternating current circuits comprising a plurality of $n$-legged energy storage and transfer devices having a pair of inductive windings on each leg thereof, electric discharge valve apparatus providing an electric discharge path for each of said windings, means for connecting one of the windings on each leg of one of said devices and its associated electric discharge path in series relation with one of the windings on a leg of the other of said devices and its associated electric discharge path, connections for energizing said windings and electric discharge paths from said alternating current circuit, means for connecting the remaining winding on each leg of one of said devices and its associated electric discharge path in series relation with the remaining winding on a leg of the other of said devices and its associated discharge path, means for serially connecting said latter windings across said direct current circuit, and means for controlling the conductivities of said electric discharge paths.

2. An electric valve converting system for transferring power between direct and alternating current circuits, one of which has a constant current characteristic, comprising a plurality of energy storage and transfer devices and each being provided with two groups of inductive windings, electric discharge apparatus providing a controlled electric discharge path for each winding of said groups of windings, means for connecting one group of windings and the associated electric discharge paths of each device in series with each other across said direct current circuit, means for connecting the remaining groups of windings and the associated electric discharge paths in series, means interconnecting said latter groups of windings with said alternating current circuit, and means for controlling the conductivities of said electric discharge paths.

3. An electric valve converting system for transferring power between direct and alternating current circuits, one of which has a constant current characteristic, comprising a plurality of energy storage and transfer devices, each provided with two groups of inductive windings, electric discharge apparatus providing a controlled electric discharge path for each winding of said groups of windings, means for connecting one group of windings and its associated electric discharge paths of each device in series with each other across said direct current circuit, means for connecting the remaining groups of windings and their associated electric discharge paths in series, means interconnecting said latter groups of windings with said alternating current circuit, a control circuit for each of said electric discharge paths, and means for energizing said control circuits with current having a frequency other than the frequency of said alternating current circuit.

4. An electric valve converting system for transferring power between direct and alternating current circuits comprising a plurality of n-legged energy storage and transfer devices each having two groups of inductive windings on the legs thereof, said one group of windings comprising an inductive winding on each leg thereof, said other group of windings comprising a plurality of inductive windings on each leg thereof, electric discharge valve apparatus providing a controlled electric discharge path for each of said windings, means for connecting said first-mentioned groups of windings and their associated electric discharge paths in series relation across said direct current circuit, means for connecting the remaining groups of windings and their associated electric discharge paths in series relation, means interconnecting said latter groups of windings with said alternating current circuit, control circuit means for controlling the conductivities of said electric discharge paths, and means for energizing said control means with currents having a frequency other than said alternating current circuit.

5. An electric valve converting system for transferring power between direct and alternating current circuits, one of which has a constant current characteristic, comprising a plurality of energy storage and transfer devices, each provided with two groups of inductive windings, electric discharge apparatus providing a controlled electric discharge path for each winding of said groups of windings, means for connecting one group of windings and the associated electric discharge paths of each device in series with each other across said direct current circuit, means for connecting the remaining groups of windings and the associated electric discharge paths in series with each other, means interconnecting said latter groups of windings with said alternating current circuit, means for controlling the conductivities of said electric discharge paths, and means for shifting the instants of conductivity of the electric discharge paths associated with one of said circuits relative to the instant of conductivity of the electric discharge paths of the other of said circuits to control the transfer of energy between said circuits.

6. An electric valve converting system for transferring power between direct and alternating current circuits, one of which has a constant current characteristic, comprising a plurality of energy storage and transfer devices, each provided with two groups of inductive windings, electric discharge apparatus providing a controlled electric discharge path for each winding of said groups of windings, means for connecting one group of windings and their associated electric discharge paths of each device in series with each other across said direct current circuit, means for connecting the remaining groups of windings and their associated electric discharge paths in series with each other, means interconnecting said latter groups of windings with said alternating current circuit, a control circuit for each of said electric discharge paths, and means for energizing said control circuits with current having a frequency greater than the frequency of said alternating current circuit.

7. An electric valve converting system for transferring power between direct and alternating current circuits comprising a plurality of n-legged energy storage and transfer devices each having two groups of inductive windings on the legs thereof, said one group of windings comprising an inductive winding on each leg thereof, said other groups of windings comprising a plurality of inductive windings on each leg thereof, electric discharge valve apparatus providing a controlled electric discharge path for each of said windings, means for connecting said first-mentioned group of windings and their associated electric discharge paths in series relation across said direct current circuit, means for connecting the remaining groups of windings and their associated electric discharge paths in series with each other, means interconnecting said latter groups of windings with said alternating current circuit, control circuit means for controlling the conductivities of said electric discharge paths, and means for energizing said control means with currents having a frequency greater than said alternating current circuit.

WILLIAM A. DODGE,
*Administrator of the Estate of Camil A. Sabbah, Deceased.*

CARL C. HERSKIND.